US011440806B2

(12) United States Patent
van der Eerden et al.

(10) Patent No.: US 11,440,806 B2
(45) Date of Patent: Sep. 13, 2022

(54) STABLE SOLUTION OF SODIUM AND IRON SILICATE, PROCESS FOR PREPARING SAID SOLUTION AND USES THEREOF

(71) Applicant: PQ Silica Brazil Ltda., São Paulo (BR)

(72) Inventors: Joris Antonius van der Eerden, Eben-Emael (BE); Flavio Ernesto Ribeiro, Plainfield, IL (US); Ronaldo dos Santos Flor, São bernardo do Campo (BR)

(*) Notice: Subject to any disclaimer, the term of this patent is extended or adjusted under 35 U.S.C. 154(b) by 21 days.

(21) Appl. No.: 16/993,661

(22) Filed: Aug. 14, 2020

(65) Prior Publication Data
US 2022/0048779 A1    Feb. 17, 2022

(30) Foreign Application Priority Data
Aug. 12, 2020 (BR) .................. 10 2020 016451 1

(51) Int. Cl.
*C01B 33/32* (2006.01)
(52) U.S. Cl.
CPC .................................. *C01B 33/325* (2013.01)
(58) Field of Classification Search
CPC ..................................................... C01B 33/32
See application file for complete search history.

(56) References Cited

U.S. PATENT DOCUMENTS

| | | | |
|---|---|---|---|
| 3,163,518 A | 12/1964 | Cavanagh et al. | |
| 3,235,371 A | 2/1966 | Volin et al. | |
| 4,004,428 A * | 1/1977 | Tazawa ................ | C09K 17/46 405/263 |
| 4,770,866 A | 9/1988 | Christophliemk et al. | |
| 5,000,933 A | 3/1991 | Novotny et al. | |
| 2007/0197686 A1 | 8/2007 | Dimanshteyn et al. | |

FOREIGN PATENT DOCUMENTS

| | | |
|---|---|---|
| BE | 649739 | 12/1964 |
| BR | 102019018080-3 | 12/2019 |
| BR | 102019009592 B1 | 7/2020 |
| CA | 2667933 | 1/2012 |
| CN | 102424394 A | 4/2012 |
| CN | 103265044 A * | 8/2013 |
| CN | 103910362 A | 7/2014 |
| CN | 108178264 A | 6/2018 |
| DE | 2619604 | 11/1976 |
| EP | 0033108 A1 | 3/1983 |
| GB | 2119779 B | 7/1985 |
| JP | S5727922 U | 2/1982 |
| WO | 2007010202 A1 | 1/2007 |

OTHER PUBLICATIONS

English machine translation of CN-103265044-A (Year: 2013).*
"Caustic Extraction of Silica from Iron Ores—Precipitation of Silica from Sodium Silicate Solutions with Carbon Dioxide"; by Mehta, Anal J. ; Tiemann, Theodore D., The American Institute of Mining, Metallurgical, and Petroleum Engineers, Publication Date: Jan. 1, 1977; https://www.onemine.org/document/abstract.cfm?docid=7341&title=Caustic-Extraction-of-Silica-from-Iron-Ores--Precipitation-of-Silica-from-Sodium-Sili . . . May 15, 2020.
"Stabilization of Low-Modulus Sodium Silicate Solutions by Alkali Substitution" by Provis, J.L., et al., I&EC Research, Pubs.acs.org/IECR; 2012 American Chemical Society, Ind. Eng.Chem. Res. 2012, 51, 2483-2486.
"Obtaining and Characterization of Biocompatible Co—Cr as Cast Alloys" by Geanta, V., et al.; Key Engineering Materials Online: Sep. 10, 2013, ISSN: 1662-9795, vol. 583, pp. 16-21, doi:10.4028/www.scientific.net/KEM.583.16, © 2014 Trans Tech Publications Ltd, Switzerland.
International Search Report for PCT/US2021/045533 dated Nov. 23, 2021.
Written Opinion of the International Searching Authority for PCT/US2021/045533 dated Nov. 23, 2021.

* cited by examiner

*Primary Examiner* — Peter F Godenschwager
(74) *Attorney, Agent, or Firm* — Buchanan Ingersoll & Rooney PC

(57) ABSTRACT

The present invention refers to a stable sodium and iron silicate solution that has a weight ratio of $SiO_2$ to $Na_2O$ from 1.5 to 2.5 and a total percentage of solids, expressed by the sum of $SiO_2$ and $Na_2O$, from 20% to 55%. Said solution also has a soluble iron content, expressed by Fe, from 0.1% to 7%, and a water content from 38% to 79.9%. The present invention also refers to the process for preparing said stable solution of sodium and iron silicate, which comprises the steps of: (a) providing a siliceous material containing iron; (b) submitting said siliceous material containing iron to a hydrothermal treatment with caustic soda under high temperature and controlled pressure; and (c) filtering said reacted solution to separate the reacted portion of the hydrothermal treatment from the unreacted portion. Additionally, the present invention refers to the uses of said stable sodium and iron silicate solution.

5 Claims, No Drawings

STABLE SOLUTION OF SODIUM AND IRON SILICATE, PROCESS FOR PREPARING SAID SOLUTION AND USES THEREOF

FIELD OF THE INVENTION

The invention disclosed and claimed refers to a stable solution of sodium and iron silicate. The long-term stability of the solution is achieved by introducing soluble iron into silicate by extracting silica from sources containing some iron in its composition. The present invention also refers to the process for preparing said stable solution of sodium and iron silicate, its uses and applications.

BACKGROUND OF THE INVENTION

The iron ore and kaolin processing processes produce a large amount of tailings. These tailings essentially contain ore, sand and water, and represent a concern for the mining industry due to the large impact they can have on the environment if it does not receive the appropriate treatment. Consequently, it is of utmost importance that these tailings be reused efficiently to reduce environmental impact as much as possible. One of the possibilities for the effective reuse of the mentioned tailings is the production of stable solutions of sodium and iron silicate, which are the object of this patent application.

Sodium silicate solutions are known in the industry for being very versatile products with multiple uses. They can be produced as a clear, low turbidity solution by applying a filtering step. There are also other forms of silicate that are not filtered and, therefore, present some turbidity, and are presented as a hazy solution. Typically, long-term stability is a potential problem for all silicate products. Impurities in the silicate solution, such as calcium and/or magnesium, can act as seeds that lead to the formation of polymeric micelles and polysilicates. Such forms of polysilicate are long polymer chains that can precipitate into the solution, causing sedimentation of solids over time, while polymeric micelles remain suspended, but can increase turbidity. If above 40° C., the storage temperature of silicate can also contribute to accelerate the formation of polysilicates or polymeric micelles. It is known in the industry that a clear (filtered) sodium silicate solution will have greater storage stability compared to a hazy (unfiltered) solution.

Turbidity is a measure of the water clarity and is related to the amount of suspended matter present in water. Clean water has a lower turbidity value, while turbid or murky waters will have a higher turbidity value. For example, rivers can have highly colored water at certain times of the year; but this should not be confounded with turbidity. Water may contain a significant amount of color that looks brown and still has a very good clarity or low turbidity, based on measurements from the Nephelometric Turbidity Unit (NTU). NTU is a well-known unit of measure in the state of the art and accepted by industry for turbidity, and is determined by an optical measurement of the water's ability to disperse and absorb light, rather than transmitting it in straight line.

Sodium silicate solutions can be produced by the direct fusion of a sand source with sodium carbonate in an oven at 1,500° C. The sodium silicate fused in the oven is cooled and the formed glass is subsequently dissolved with water vapor and temperature/pressure, resulting in a sodium silicate solution. This solution can be filtered using a filter aid to produce a transparent silicate or be used without filtration with some turbidity inherent to the solution. The typical mass ratios of $SiO_2$ to $Na_2O$ through the oven process route ranges from 1.6 to 3.5.

Sodium silicate solutions can be also produced via hydrothermal dissolution of sand sources with caustic soda at temperature and pressure using rotating or stirring static autoclaves. This process is usually carried out with excess sand and goes through a final filtration process to recover and recycle excess sand, thus removing sand that did not react for producing a clear solution. In this case, unreacted sand acts as a filter medium.

It is known from the state of the art that the production of sodium silicate solutions through the hydrothermal reaction of sand and caustic soda is limited to the sand silica source. Typically, sand sources, which are mostly crystalline by nature, will allow an operational window of mass ratio of $SiO_2$ to $Na_2O$ in the range of 1.5 to 2.5. With the introduction of silica sources from cristobalite or heat-treated sand, the mass ratio for the operational window of $SiO_2$ to $Na_2O$ can be expanded up to 3.7.

U.S. Pat. No. 4,770,866 describes a process for the production of clear sodium silicate solutions by hydrothermal synthesis with a weight ratio of $SiO_2$ to $Na_2O$ from 1.9 to 2.1, reacting 5-10% excess sand, with at least 99% by weight of $SiO_2$, with 25-35% sodium hydroxide solution in a rotative cylindrical pressure reactor at a temperature of 200-250° C. and saturated vapor pressure, followed by filtration to separate excess sand from silicate using perlite as a filter aid.

European Patent No. EP0033108B2 describes a process for producing sodium silicate solutions with a weight ratio of $SiO_2$ to $Na_2O$ of 1.0 to 2.8 per sand reaction with 20-30% sodium hydroxide solution in a rotative cylindrical pressure reactor at a temperature of 170-250° C. and saturated vapor pressure. There is an excess of sand of up to 300% based on the molar ratios of $SiO_2$ to $Na_2O$ in the filtered mixture, and the unreacted sand is recycled back into the process. Excess sand acts as a filter medium.

U.S. Pat. No. 5,000,933 describes a process for producing sodium silicate aqueous solution by hydrothermal treatment in a closed pressure reactor at a temperature between 150° C. and 300° C. and under saturated vapor pressure with a weight ratio of $SiO_2$ to $Na_2O$ from 2.9 to 3.7 using a silica source containing at least 50% cristobalite or produced by sand heat treatment at a temperature of at least 1,100° C., but below the silica melting point.

Sodium silicate solutions can be also produced from siliceous sources that contain enough silica to react with an alkaline (caustic soda or sodium carbonate). As mentioned earlier, one of these sources may be a siliceous material containing iron, such as kaolin processing tailings or flotation tailings for iron ore processing. These siliceous materials are typically provided as a water paste in sedimentation ponds and contain a reasonable amount of crystalline silica that can be digested with alkaline treatment.

U.S. Pat. No. 3,163,518 describes a process for releasing silica from a siliceous iron ore to obtain a more purified iron ore, exposing the ore to sodium hydroxide in an amount between 1 and 14% by weight and subjecting the mixture to a temperature between 260° C. and 400° C. and a pressure between 7 bar and atmospheric. The solution is hydrothermally treated under those conditions, maintaining a vapor atmosphere under saturation or overheated conditions, followed by cooling to decrease the temperature for further separation of the solution and the unreacted material.

SUMMARY OF THE INVENTION

Surprisingly, it was found that a sodium silicate solution, made of siliceous material containing iron, has long-term stability. The digestion of this siliceous material produces a sodium and iron silicate with a brownish red color, due to the presence of soluble iron compounds and a degree of turbidity. Due to these properties, it would not be expected that the sodium and iron silicate solution would be stable under long-term storage conditions. However, a stability test performed with static samples maintained at a temperature of 60° C. for eight weeks did not show an appreciable change in initial turbidity nor formation of settled solid deposits. The same stability study performed in a silicate made with crystalline silica from a purified sand source with more than 98% $SiO_2$ content by weight resulted in a considerable increase in turbidity in the same period. The same stability study performed in a silicate made with a pretreated siliceous material containing iron to remove iron before hydrothermal digestion also showed a reasonable increase in turbidity in the same period (see table 4 below).

The long-term stability property of the siliceous material containing iron can be attributed to the presence of solution-soluble iron compounds that prevent the formation of polymeric micelles and polysilicates over time, making this type of silicate solution different from any other type of crystalline sand source with low iron content. Thus, the presence of iron is an inhibitor for the formation of polymeric compounds from calcium and magnesium.

The stable solution of sodium and iron silicate, object of the present invention, is preferably obtained from a process comprising the following steps:
 a. providing a siliceous material containing iron;
 b. submitting said siliceous material containing iron to a hydrothermal treatment with caustic soda under high temperature and controlled pressure; and
 c. filtering said reacted solution to separate the reacted portion of the hydrothermal treatment from the unreacted portion.

More specifically, this process comprises the following steps:
 a. a siliceous material containing iron and having a free humidity of less than 10% is introduced into a batch tank with water and caustic soda at room temperature;
 b. the mixture of the batch tank containing the siliceous material, water and caustic soda is transferred to a rotative autoclave or to a stirring vertical container and the temperature is increased to 120° C. to 220° C. under saturated vapor pressure and the batch is hydrothermally treated for 3 to 6 hours under controlled pressure;
 c. the batch is transferred to a retention tank to relieve pressure, cooled to less than 90° C. and filtered into a press filter using unreacted material as precoat.

The precoat can be washed later to recover $Na_2O$, which can be recycled back into the treatment tank as a source of caustic soda, thereby reducing the amount of fresh caustic soda added to the next batch.

Although they have some color and turbidity, those skilled in the art would find many potential uses for the sodium and iron silicate solutions of the present invention. One of the uses may be as binder agent for fines, where color may not be a disqualifying issue. The binder can be used in pelletizing, briquetting or similar technologies.

Another use of sodium and iron silicate may be in the production of precipitated silica, where color may not be a disqualifying issue. One of the most important markets for precipitated silicas is rubber reinforcement, widely used in green tires.

Another use of sodium and iron silicate can be in the casting industry as a binder for sand molds, in the ceramic industry as a deflocculant agent, and refractories as binder for clays and adhesives.

Another use of sodium and iron silicate may be in the production of silica gel, where color may not be a disqualifying issue. Some of the potential markets for this type of silica gel may be in the method of treating biodiesel and as a flow promoting agent.

PREFERRED EMBODIMENT OF THE INVENTION

Although the present invention is described with reference to preferred embodiments, it will be understood by those skilled in the art that several changes can be made and the equivalents can be replaced by elements thereof.

Sodium and iron silicate solutions can be produced through a hydrothermal treatment of siliceous material containing iron with caustic soda in a rotative or static autoclave stirred under high temperature and controlled pressure.

In a preferred embodiment of the present invention, the siliceous material containing iron must be separated from water and have at least 65% crystalline silica. Some residual moisture may be present in the material if it can be handled by a bulk solids handling system.

Preferably, the siliceous material containing iron should be mixed with caustic soda and water and hydrothermally treated at temperatures of 120° C. to 220° C. under saturated vapor pressure. The weight ratio of $SiO_2$ to $Na_2O$ must be between 1.5 and 2.5 and any material that has not reacted must be filtered to produce a sodium and iron silicate solution. The solution should have a total percentage of solids, expressed by the sum of $SiO_2$ and $Na_2O$, between 20% and 55%, with a soluble iron content, expressed in Fe, from 0.1% to 7%, and the mass balance being water.

Additional Description of Process Conditions

Experiment 1

Sodium silicate standards were stored at 80° C. in polypropylene vials. The formation of polysilicate was followed in time by measuring the turbidity (NTU) of silicate solutions after 0, 12, 23 and 40 days. After 40 days, silicate solutions were centrifuged. The solid polysilicate material was washed 3 times with demineralized water and was subsequently filtered. The solid polysilicate material was dried at 120° C. for 15 hours and the amount of polysilicate was weighed. The results of the experiment are shown in table 1.

TABLE 1

| Sodium silicate grade | Turbidity (NTU) | | | | Polysilicate concentration |
|---|---|---|---|---|---|
| (R = 3.3) | Start | 12 days | 23 days | 40 days | after 40 days |
| Filtered | 1.4 | 36.4 | 78.3 | 1788 | 0.61% |
| Unfiltered | 15.4 | 47.3 | 238 | >4000 | 1.95% |

Table 1 shows increased turbidity as measured by NTU over time. The results show that the unfiltered sodium silicate standard has a higher initial and final turbidity compared to the filtered sodium silicate standard. The degree of turbidity is correlated with the degree of polysilicate formation.

It is possible to observe very fine flakes (polysilicates) above 40 NTU. After 40 days, visible solid polysilicates were measured and expressed. Unfiltered sodium silicate contained 1.95% polysilicate. Filtered sodium silicate contained 0.61% polysilicate. These results show that regardless of the type of sodium silicate and of whether sodium silicate has been filtered, the turbidity of a sodium silicate solution will significantly increase over time.

Experiment 2

Three different siliceous sources were used to carry out an experiment to establish a weight ratio ($SiO_2$:$Na_2O$) from 2.0 to 2.2 of sodium silicate solution. All siliceous sources were hydrothermally treated in a rotative autoclave with 30% caustic soda at 200° C. and saturated vapor pressure for 4 hours. An excess of 10% of the siliceous source was used, and the resulting solution was filtered to obtain an impurity-free silicate solution.

A siliceous material containing approximately 92% $SiO_2$, 3% Fe, 0.6% $Al_2O_2$ and 4% $H_2O$ as moisture was used (Sample 1).

The same siliceous material was first treated with a 50% HCl solution and washed. The pre-treatment was intended to solubilize and remove the iron from the sand source to obtain a colorless silicate solution (Sample 2). A source of crystalline sand (Beaujean) with >98% $SiO_2$ (Sample 3) was used as a control source.

The resulting products produced in samples 1, 2 and 3 were analyzed, and their constituents were determined. The traces of non-dissolved metals in sand sources and sodium silicate solutions are listed in table 2 below:

TABLE 2

| Metals or oxides | | Beaujean Sand | Siliceous iron source | Sample 1 | Sample 2 | Sample 3 |
| --- | --- | --- | --- | --- | --- | --- |
| $Al_2O_3$ | [ppm] | 937 | 6,000 | 1,905 | 956 | 446 |
| CaO | [ppm] | 150 | 130 | 67 | 57 | 52 |
| MgO | [ppm] | 81 | 83 | 33 | 30 | 27 |
| Fe | [ppm] | 141 | 30,000 | 545 | 46 | 27 |

Table 2 shows that the sodium silicate solution from untreated siliceous source had a high content of soluble iron. With pretreatment with HCl, a significant portion of the iron was washed, resulting in a limited amount of iron in the silicate solution. However, the iron content of the solutions produced in Experiments 1 and 2 was higher than in the control sand. The level of calcium and magnesium, precursors of formation of polysilicate and polymeric micelles, was equivalent in the three silicate solutions. Calcium and magnesium levels in the control sand (Beaujean) are considered medium to high as potential precursors for the formation of polymeric micelles and polysilicates.

The silicate solution resulting from each experiment was measured for determining its turbidity and color. The results of these measurements are expressed in table 3 below:

TABLE 3

| Sample | Turbidity (NTU) | CIELAB Color L | CIELAB Color a | CIELAB Color b |
| --- | --- | --- | --- | --- |
| #1 Iron Ore | 73.3 | 21.93 | 23.95 | 36.70 |
| #2 Treated Iron Ore | 29.8 | 80.11 | 6.24 | 5.87 |
| #3 Beaujean Sand | 5.8 | 89.83 | 2.61 | 10.03 |

Table 3 shows that the sodium and iron silicate solution had a distinct brownish red tone. The solution of treated siliceous material had a light pink color. The control sand had a water appearance.

The silicate solution resulting from each experiment was stored under static conditions, at a temperature of 60° C., to collect data on the long-term storage stability. The results are listed in table 4, below:

TABLE 4

| | | Turbidity | |
| --- | --- | --- | --- |
| Sample No. | Silicate Solution | Start of test (NTU) | Week 8 (NTU) |
| 1 | Silicesous material | 73.3 | 75.2 |
| 2 | Treated siliceous material | 29.8 | 37.1 |
| 3 | Sand (Beaujean) | 5.8 | 38.3 |

Table 4 shows that the sodium silicate solution obtained from untreated iron ore is stable at a temperature of 60° C. for 8 weeks under static storage conditions, i.e., turbidity is in the same order of magnitude before and after the static storage stability test. Treated iron ore has a considerable increase in turbidity. The control solution of sand silicate had a significant increase in turbidity, indicating long-term storage instability.

The experiments above demonstrate that the presence of iron in a sodium silicate solution provides long-term stability. Such sodium and iron silicate solutions can provide a stable shelf-life solution for applications where the color of sodium silicate solution is not a concern.

Although the description above contains certain specificities, they should not be interpreted as limitations to the scope of the invention, but as an example of a preferred embodiment of the same. Therefore, the scope of the present invention must not be determined by the embodiments illustrated, but by the attached set of claims and its legal equivalents.

What is claimed is:

1. A stable sodium and iron silicate solution having a weight ratio of $SiO_2$ to $Na_2O$ from 1.5 to 2.5 and a total percentage of solids, expressed by the sum of $SiO_2$ and $Na_2O$, from 20% to 55%, said solution having a soluble iron content, expressed by Fe, from 0.1% to 1.0%, and a water content from 38% to 79.9%.

2. The stable sodium and iron silicate solution of claim 1, wherein said solution is used as a binder agent for fines.

3. The stable sodium and iron silicate solution of claim 1, wherein said solution is used in the manufacture of precipitated silica.

4. The stable sodium and iron silicate solution of claim 1, wherein said solution is used as a binder for sand molds, as a deflocculant agent in the ceramic industry, or as binder for clays and adhesives.

5. The stable sodium and iron silicate solution of claim 1, wherein said solution is used in the manufacture of silica gel.

* * * * *